United States Patent
Takahata et al.

(10) Patent No.: US 9,300,826 B2
(45) Date of Patent: Mar. 29, 2016

(54) MULTI-FUNCTION PERIPHERAL HAVING A LINK MECHANISM FOR MOVING A SHEET SUPPORTER TO A SECOND POSITION IN CONJUNCTION WITH AN UPWARD MOVEMENT OF A BASE

(71) Applicant: BROTHER KOGYO KABUSHIKI KAISHA, Nagoya-shi, Aichi-ken (JP)

(72) Inventors: Muneaki Takahata, Toyoake (JP); Yuta Uchino, Aichi (JP); Tianjin Xie, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/574,054

(22) Filed: Dec. 17, 2014

(65) Prior Publication Data
US 2015/0181062 A1 Jun. 25, 2015

(30) Foreign Application Priority Data
Dec. 20, 2013 (JP) .................................. 2013-264415

(51) Int. Cl.
*H04N 1/00* (2006.01)
*H04N 1/12* (2006.01)

(52) U.S. Cl.
CPC ....... *H04N 1/00522* (2013.01); *H04N 1/00525* (2013.01); *H04N 1/00551* (2013.01); *H04N 1/00588* (2013.01); *H04N 1/121* (2013.01); H04N 2201/0094 (2013.01); H04N 2201/0422 (2013.01)

(58) Field of Classification Search
CPC .......... H04N 1/00522; H04N 1/00525; H04N 1/00551; H04N 1/00588; H04N 1/121; H04N 2201/0422; H04N 2201/0094
USPC .................................. 358/505, 474, 496–498
See application file for complete search history.

(56) References Cited

U.S. PATENT DOCUMENTS

| | | | |
|---|---|---|---|
| 4,787,616 A * | 11/1988 | Sasaki | B65H 39/11 271/176 |
| 6,009,303 A * | 12/1999 | Kumagai | H04N 1/00567 271/3.14 |
| 6,088,135 A * | 7/2000 | Kusumoto | H04N 1/00567 358/496 |
| 8,585,201 B2 | 11/2013 | Miura | |
| 2004/0070798 A1* | 4/2004 | Andersen | G03G 15/607 358/498 |
| 2006/0193013 A1* | 8/2006 | Hoshi | H04N 1/00708 358/474 |

(Continued)

FOREIGN PATENT DOCUMENTS

JP            5041042 B2   10/2012

*Primary Examiner* — Benny Q Tieu
*Assistant Examiner* — Quyen V Ngo
(74) *Attorney, Agent, or Firm* — Merchant & Gould P.C.

(57) ABSTRACT

A multi-function peripheral including an opening-closing member supported by a main body to be swingable around a first axis parallel to a side surface of the main body, between a closed position and an open position, a sheet supporter supported by the main body to be swingable around a second axis parallel to the first axis, between a first position to be on a trajectory of the opening-closing member and a second position to be slanted relative to the side surface, a hinge disposed between the main body and the opening-closing member and including a base attached to the main body to be movable in a vertical direction together with the first axis, and a link mechanism disposed between the base and the sheet supporter and configured to move the sheet supporter to the second position in conjunction with an upward movement of the base.

12 Claims, 11 Drawing Sheets

(56) References Cited

U.S. PATENT DOCUMENTS

| | | | | |
|---|---|---|---|---|
| 2006/0261539 A1* | 11/2006 | Terada | ............... | G03G 15/6502 271/162 |
| 2007/0064282 A1* | 3/2007 | Kobayashi | ......... | H04N 1/00002 358/474 |
| 2012/0001993 A1 | 1/2012 | Miura | | |
| 2012/0307324 A1* | 12/2012 | Tu | ..................... | H04N 1/00522 358/498 |
| 2012/0320392 A1* | 12/2012 | Asaoka | .............. | G03G 21/1609 358/1.9 |
| 2013/0135647 A1* | 5/2013 | Miyanagi | ............... | G06K 15/02 358/1.13 |
| 2014/0211283 A1* | 7/2014 | Mori | .................... | H04N 1/0053 358/498 |
| 2015/0156374 A1* | 6/2015 | Washizawa | .............. | H04N 1/12 358/406 |

* cited by examiner

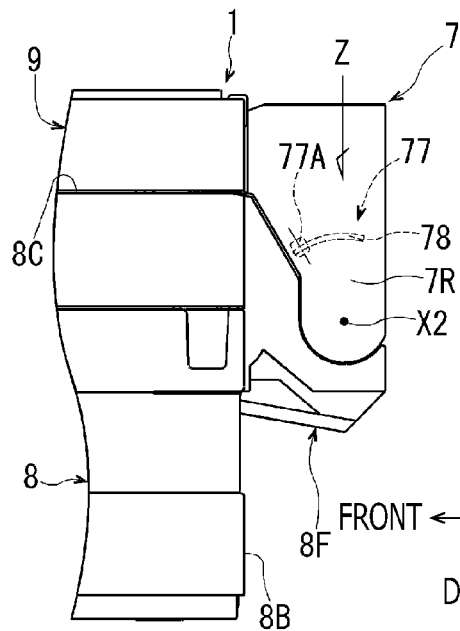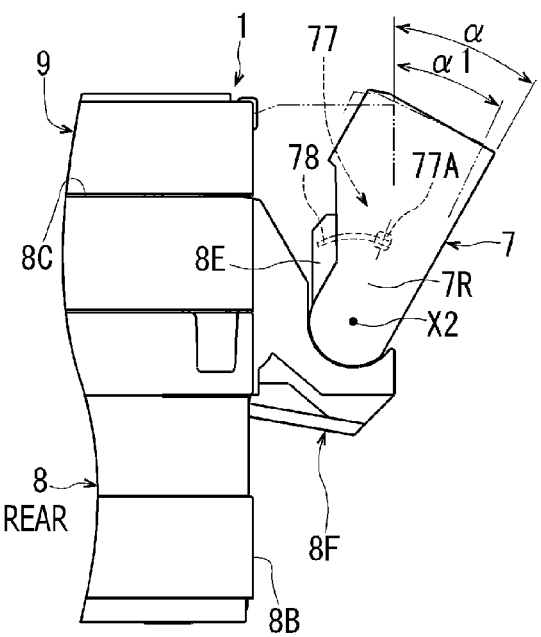
FIG. 9A  FIG. 9B
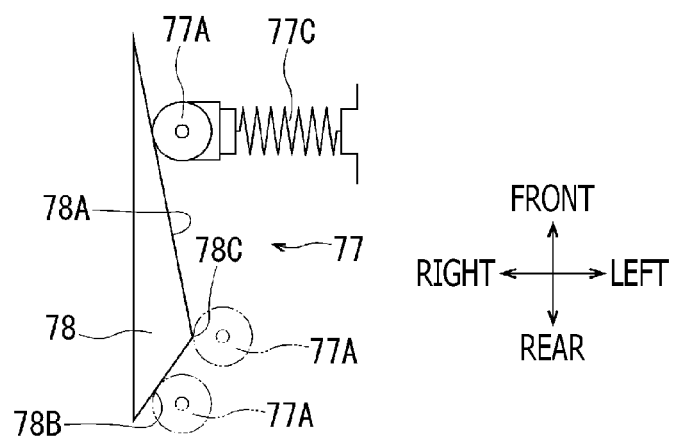
FIG. 10

MULTI-FUNCTION PERIPHERAL HAVING A LINK MECHANISM FOR MOVING A SHEET SUPPORTER TO A SECOND POSITION IN CONJUNCTION WITH AN UPWARD MOVEMENT OF A BASE

CROSS-REFERENCE TO RELATED APPLICATION

This application claims priority under 35 U.S.C. §119 from Japanese Patent Application No. 2013-264415 filed on Dec. 20, 2013. The entire subject matter of the application is incorporated herein by reference.

BACKGROUND

1. Technical Field

The following description relates to aspects of a multi-function peripheral.

2. Related Art

A multi-function peripheral has been known that includes a main body, a reading unit, an image forming unit, an opening-closing member, and a sheet supporter.

A document supporting surface is formed on an upper surface of the main body. The reading unit and the image forming unit are disposed inside the main body. An insertion port is formed in a rear surface of the main body. A user is allowed to insert one or more sheets toward the image forming unit via the insertion port. The opening-closing member is supported by the main body to be swingable around a first axis substantially parallel to the rear surface of the main body. The opening-closing member is movable between a closed position to cover the document supporting surface and an open position to expose the document supporting surface. The sheet supporter is supported by the main body to be swingable around a second axis parallel to the first axis. The sheet supporter is movable between a first position to cover the insertion port and a second position where the sheet supporter is slanted relative to the rear surface and supports one or more sheets to be inserted through the insertion port.

The known multi-function peripheral may include a hinge disposed between the main body and the opening-closing member. The hinge is configured to define the first axis of the swingable opening-closing member. The hinge includes a base. The base is attached to the main body to be movable in a vertical direction along with the first axis.

In the known multi-function peripheral, when the opening-closing member is swung from the closed position to the open position, the document supporting surface is exposed. A document to be read is supported on the document supporting surface. In this state, when the opening-closing member is swung to the closed position, the opening-closing member covers the document from above. When the document is a thick book, the opening-closing member is placed in the closed position in a state where the base of the hinge is displaced upward together with the first axis relative to the main body, and the opening-closing member covers the thick document from above. The reading unit is movable under the document supporting surface. Namely, the reading unit is configured to read an image of the document placed on the document supporting surface while moving under the document supporting surface.

Further, in the known multi-function peripheral, the sheet supporter supported by the main body is swung from the first position to the second position where the sheet supporter is slanted relative to the rear surface of the main body. The sheet supporter is configured to support one or more sheets to be inserted through the insertion port. The image forming unit is configured to form images on the one or more sheets inserted through the insertion port.

Further, the known multi-function peripheral is configured such that the sheet supporter in the first position is not on a trajectory of the opening-closing member swinging around the first axis. Thereby, according to the known multi-function peripheral, it is possible to avoid interference (contact) between the opening-closing member and the sheet supporter when the opening-closing member is swung to the open position. Thus, it is possible to prevent problems such as malfunctions and damages in the opening-closing member and the sheet supporter.

SUMMARY

In the meantime, lately, a multi-function peripheral of this kind is required to be reduced in size. In this respect, the aforementioned known multi-function peripheral is configured to avoid the interference between the opening-closing member and the sheet supporter, so as to prevent problems such as malfunctions and damages in the opening-closing member and the sheet supporter. Therefore, it is difficult for the opening-closing member and the sheet supporter to be disposed close to each other. Hence, it is difficult to realize miniaturization of the known multi-function peripheral.

Further, the opening-closing member is configured to move in the vertical direction via the hinge, depending on the thickness of the document. Namely, the trajectory of the opening-closing member swinging to the open position varies depending on where the hinge is positioned in the vertical direction. Therefore, in avoiding the interference between the opening-closing member and the sheet supporter regardless of the position of the hinge, it is an inevitable problem that a degree of freedom for laying out the sheet supporter is limited.

Aspects of the present disclosure are advantageous to provide one or more improved techniques, for a multi-function peripheral, which make it possible to realize miniaturization of the multi-function peripheral while preventing problems such as malfunctions and damages in an opening-closing member and a sheet supporter.

According to aspects of the present disclosure, a multi-function peripheral is provided, which includes a main body having a document supporting surface formed on an upper surface of the main body, the document supporting surface being configured to support thereon a document to be read, and an insertion port formed in a side surface of the main body, the insertion port being configured such that a sheet for image formation is inserted through the insertion port, a reading unit disposed inside the main body, the reading unit being configured to read an image of the document supported on the document supporting surface, an image forming unit disposed inside the main body, the image forming unit being configured to form an image on the sheet inserted through the insertion port, an opening-closing member supported by the main body to be swingable around a first axis parallel to the side surface of the main body, the opening-closing member being configured to move between a closed position to cover the document supporting surface and an open position to expose the document supporting surface, a sheet supporter supported by the main body to be swingable around a second axis parallel to the first axis, the sheet supporter being configured to move between a first position where the sheet supporter covers the insertion port and is on a trajectory of the opening-closing member swinging around the first axis and a second position where the sheet supporter is slanted relative to the side surface of the main body and supports the sheet to be inserted through the insertion port, a hinge disposed between the main body and the opening-closing member, the hinge being configured to define the first axis around which the opening-closing member is swingably supported via the hinge, the hinge including a base attached to the main body to be movable in a vertical direction together with the first axis, and a link mechanism disposed between the base and the sheet supporter, the link mechanism being configured to move the sheet supporter to the second position in conjunction with an upward movement of the base.

BRIEF DESCRIPTION OF THE ACCOMPANYING DRAWINGS

FIGS. 9A and 9B are side views for illustrating operations of an urging unit of the MFP in the first illustrative embodiment according to one or more aspects of the present disclosure.

FIG. 10 is a plane view schematically showing the urging unit when viewed in a direction of an arrow Z shown in FIG. 9A, in the first illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, illustrative embodiments according to aspects of the present disclosure will be described with reference to the accompanying drawings.

First Illustrative Embodiment

Figure 1:
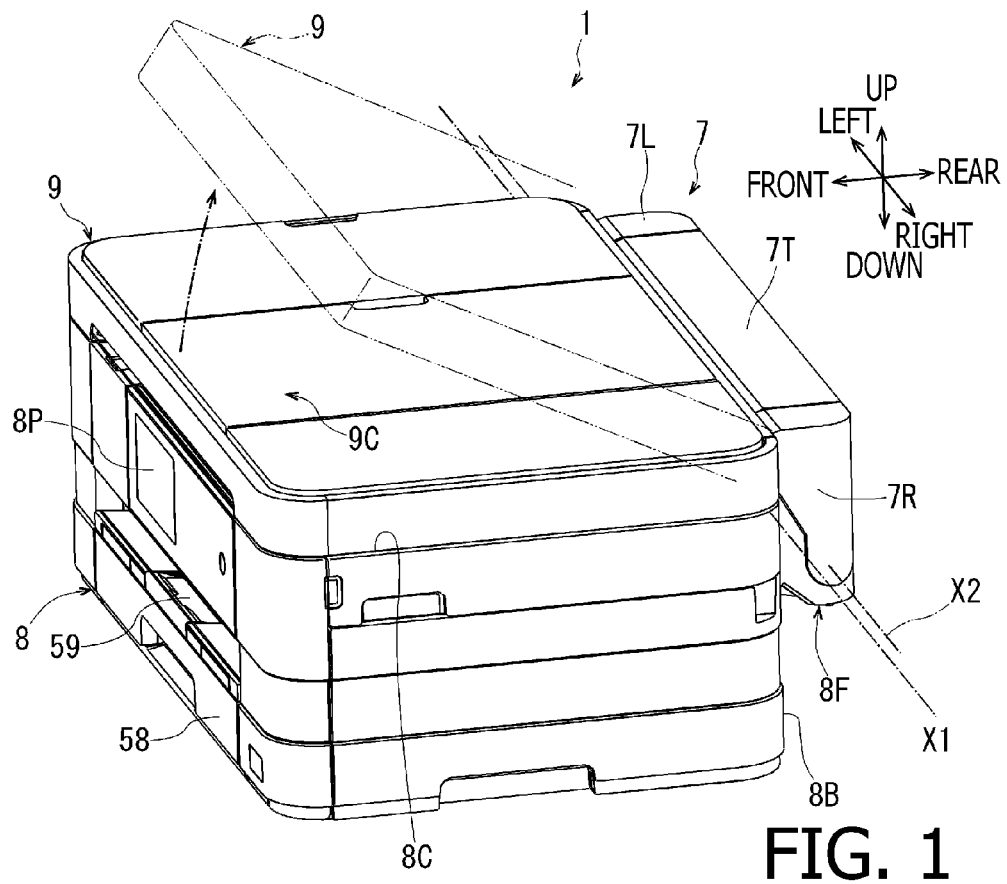
FIG. 1 is a perspective view of a multi-function peripheral (hereinafter, which may be referred to as an MFP) in a first illustrative embodiment according to one or more aspects of the present disclosure.

In a multi-function peripheral 1 (hereinafter, referred to as an MFP 1) of a first illustrative embodiment, a front-to-rear direction, a left-to-right direction, and a vertical direction of the MFP 1 will be defined as shown in FIG. 1. For instance, a front side of the MFP 1 is defined as a side where an operation panel 8P is disposed. A left side of the MFP 1 is defined as a left-hand side in a front view (i.e., when a viewer faces the operation panel 8P). The same applies to the other drawings.

<Overall Configuration>

As shown in FIGS. 1 to 6, the MFP 1 includes a main body 8, an opening-closing member 9, a reading unit 3, a conveyor 4, an image forming unit 5, and a sheet supporter 7. The main body 8 is formed substantially in a flattened box shape. As shown in FIG. 1, on a front surface of the main body 8, an operation panel 8P (such as a touch panel) is disposed.

Figure 3:
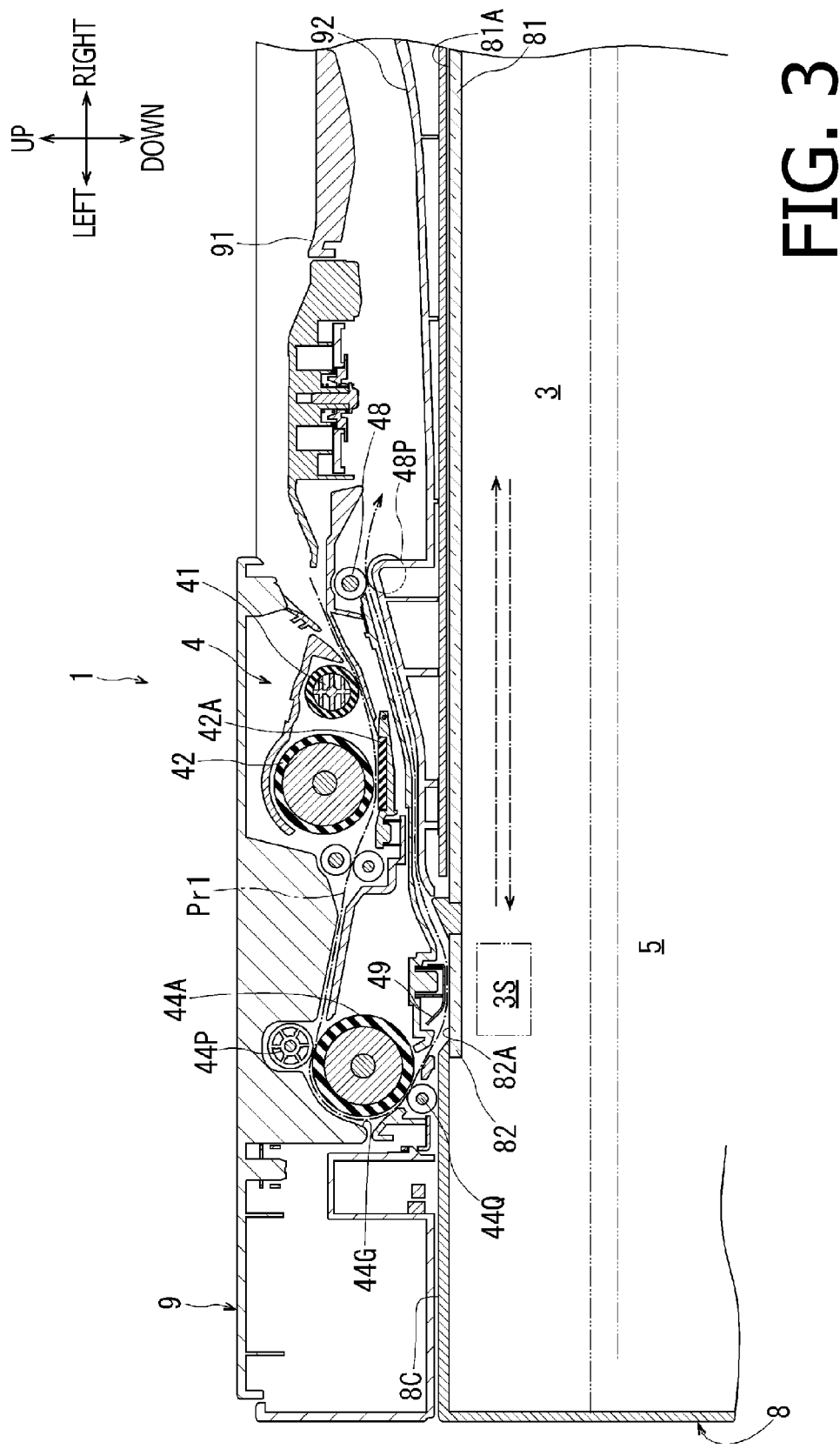
FIG. 3 is a cross-sectional front view mainly and schematically showing a reading unit and a conveyor of the MFP in the first illustrative embodiment according to one or more aspects of the present disclosure.
Figure 4:
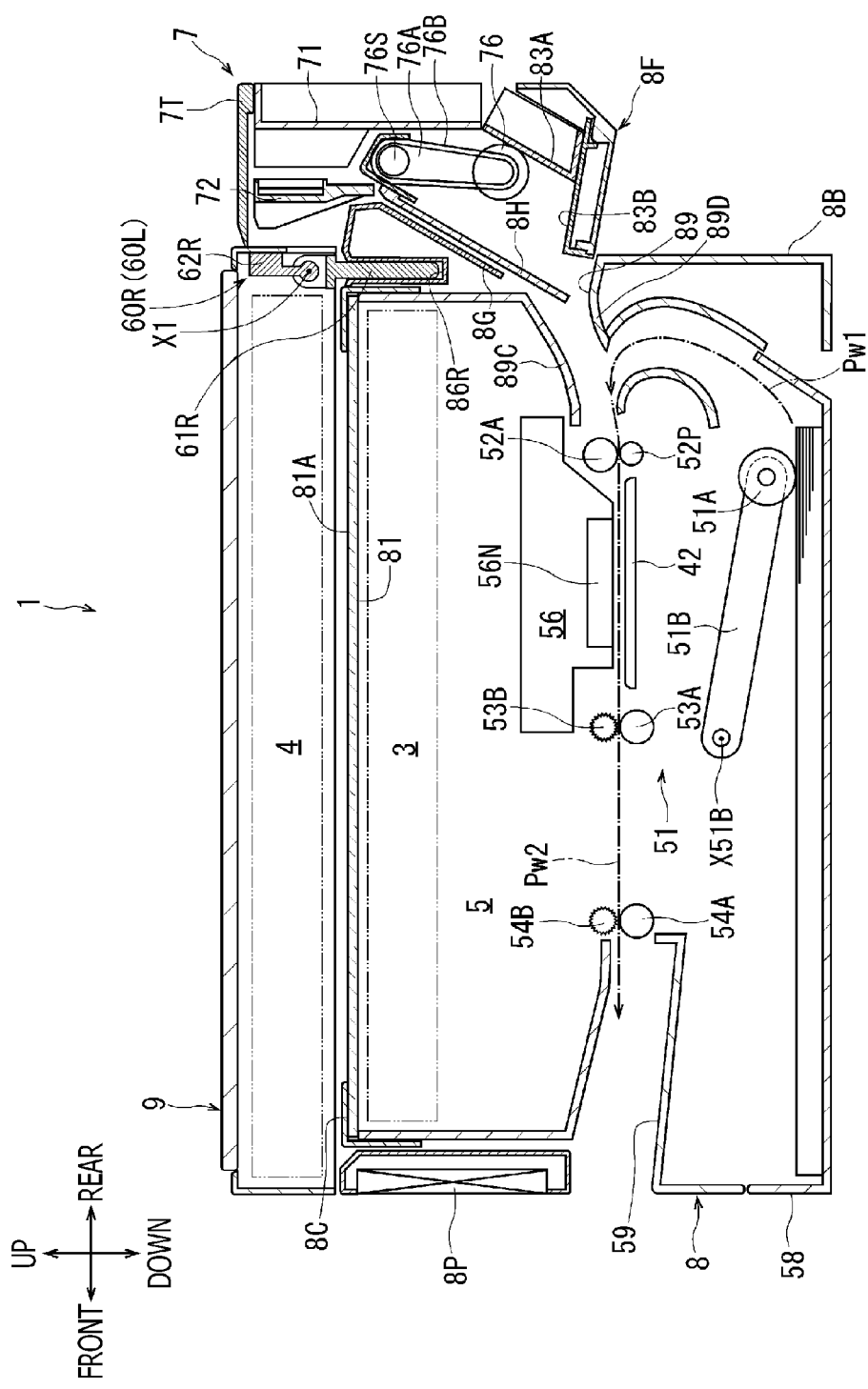
FIG. 4 is a cross-sectional side view mainly and schematically showing an image forming unit and a sheet supporter in the first illustrative embodiment according to one or more aspects of the present disclosure.

As shown in FIG. 3, on an upper surface 8C of the main body 8, a first platen glass 81 and a second platen glass 82 are disposed. As shown in FIGS. 3 and 4, an upper surface of the first platen glass 81 forms a document supporting surface 81A. The document supporting surface 81A is configured to support a document to be read from beneath when the reading unit 3 reads an image of the document in a static mode. The document to be read may include a paper, a transparency (an OHP sheet), and a book. As shown in FIG. 3, the second platen glass 82 is disposed on a left side relative to the first platen glass 81. The second platen glass 82 has a longitudinal direction along the front-to-rear direction. An upper surface of the second platen glass 82 forms a reading surface 82A. The reading surface 82A is configured to guide one or more sheets from beneath when the reading unit 3 reads images of the one or more sheets being fed on a sheet-by-sheet basis by the conveyor 4.

Figure 5:
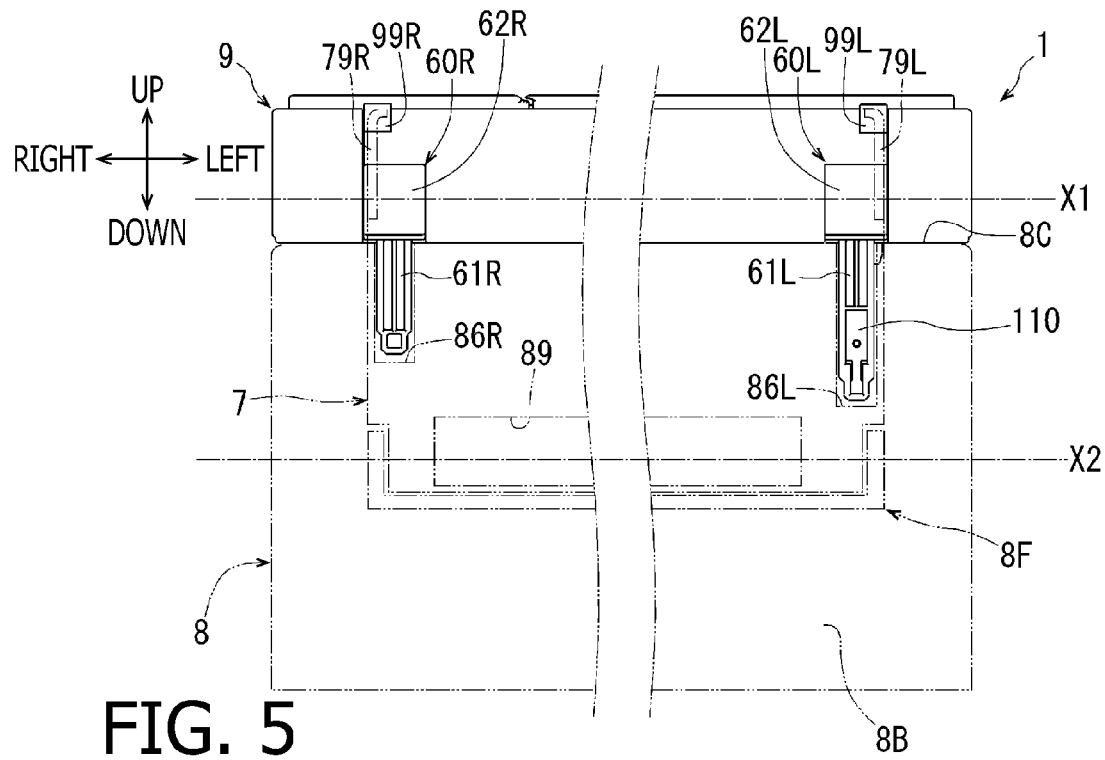
FIG. 5 is a rear view mainly and schematically showing hinges and an insertion port of the MFP in the first illustrative embodiment according to one or more aspects of the present disclosure.
Figure 6:
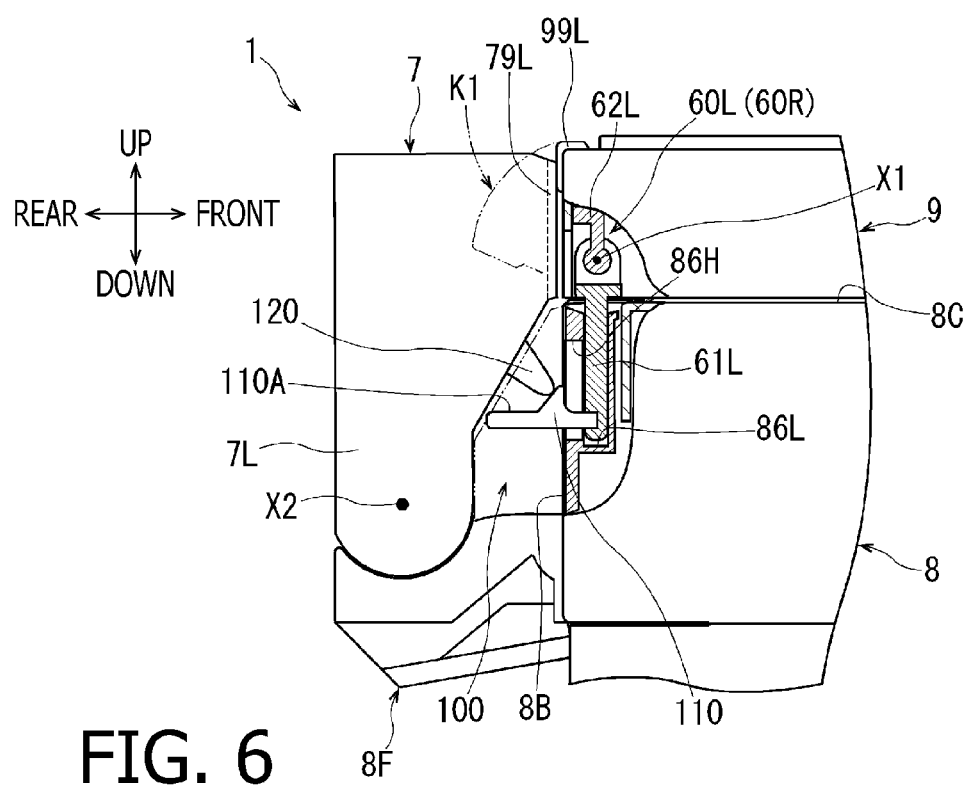
FIG. 6 is a side view schematically showing the hinges, a link mechanism, a contacting portion, and a contacted portion of the MFP in the first illustrative embodiment according to one or more aspects of the present disclosure.

As shown in FIGS. 4 to 6, the opening-closing member 9 is supported by the main body to be swingable around a first axis X1. The first axis X1 is positioned above an upper end portion of a rear surface 8B of the main body. The first axis X1 extends in the left-to-right direction parallel to the rear surface 8B.

More specifically, as shown in FIGS. 4 to 6, two hinges, i.e., a left hinge 60L and a right hinge 60R are disposed between the opening-closing member 9 and the main body 8.

The two hinges 60L and 60R are configured to define the first axis X1 around which the swingable opening-closing member 9 is swingably supported via the hinges 60L and 60R. The left hinge 60L includes a base 61L and a rotatable portion 62L. One end portion of the rotatable portion 62L is supported by the base 61L to be swingable around the first axis X1. The other end portion of the rotatable portion 62L is attached to the opening-closing member 9. The right hinge 60R includes a base 61R and a rotatable portion 62R. One end portion of the rotatable portion 62R is supported by the base 61R to be swingable around the first axis X1. The other end portion of the rotatable portion 62R is attached to the opening-closing member 9.

Each of the bases 61L and 61R is formed substantially in a rectangular column extending downward from the first axis X1. As shown in FIGS. 4 and 5, the left base 61L is inserted into a holding hole 86L and held by the main body 8 to be movable in the vertical direction. The holding hole 86L is recessed downward from the upper surface 8C of the main body 8. The right base 61R is inserted into a holding hole 86R and held by the main body 8 to be movable in the vertical direction. The holding hole 86R is recessed downward from the upper surface 8C of the main body 8. Namely, the bases 61L and 61R are attached to the main body 8 so as to be movable in the vertical direction together with the first axis X1.

As indicated by a solid line in FIG. 1, when closed, the opening-closing member 9 covers the document supporting surface 81A from above. Hereinafter, a position of the opening-closing member 9 indicated by the solid line in FIG. 1 may be referred to as a closed position. As indicated by an alternate long and two short dashes line in FIG. 1, the opening-closing member 9 swings around the first axis X1 such that a front end portion of the opening-closing member 9 moves toward an upper rear side. Thereby, the document supporting surface 81A is exposed. Thus, a user is allowed to put a document to be read onto the document supporting surface 81A. Hereinafter, a position of the opening-closing member 9 of which the document supporting surface 81A is exposed may be referred to as an open position, regardless of a swing angle of the opening-closing member 9 relative to the main body 8. A position of the opening-closing member 9 indicated by the alternate long and two short dashes line in FIG. 1 is an example of the open position.

When moving to the closed position in a state where the document to be read is supported on the document supporting surface 81A, the opening-closing member 9 properly covers the document from above. When the document is a thick book, the opening-closing member 9 moves to the closed position in a state where the bases 61L and 61R of the hinges 60L and 60R are moved upward together with the first axis X1 relative to the main body 8. Thereby, the opening-closing member 9 properly covers the thick document from above.

<Reading Unit and Conveyor>

As shown in FIG. 3, the reading unit 3 is disposed on an upper side inside the main body 8. The reading unit 3 includes a reading sensor 3S and a scanning mechanism (not shown). The reading sensor 3S is disposed below the document supporting surface 81A and the reading surface 82A. The scanning mechanism is configured to reciprocate the reading sensor 3S along the left-to-right direction inside the main body 8. As the reading sensor 3S, a known image sensor may be used such as a contact image sensor (hereinafter referred to as a CIS) or a charge coupled device (hereinafter referred to as a CCD).

Figure 2:
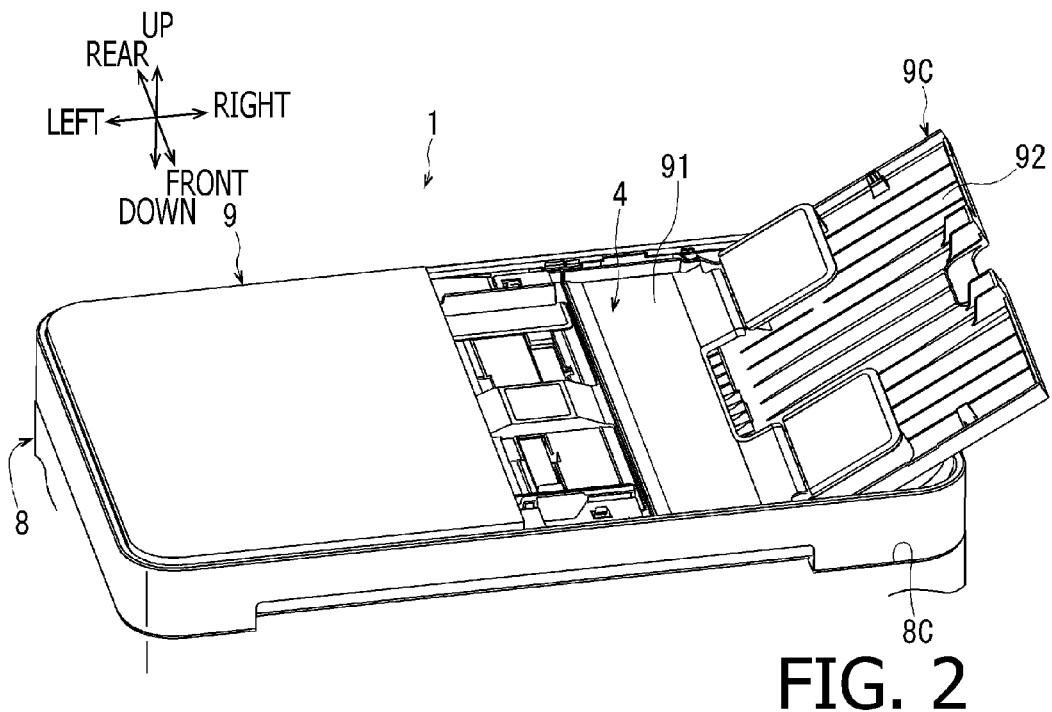
FIG. 2 is a perspective view showing a part of the MFP in the first illustrative embodiment according to one or more aspects of the present disclosure.

As shown in FIGS. 2 and 3, the conveyor 4 is disposed at the opening-closing member 9. The conveyor 4 includes a supply tray 91 and a discharge tray 92. The supply tray 91 and the discharge tray 92 are formed on a right side relative to the opening-closing member 9, when a cover 9C closed as shown in FIG. 1 is extended as shown in FIG. 2. The discharge tray 92 is disposed below the supply tray 91. The supply tray 91 is configured to support, from beneath, sheets to be conveyed by the conveyor 4. The discharge tray 92 is configured to support one or more sheets discharged by the conveyor 4 after images of the one or more sheets have been read by the reading unit 3.

As shown in FIG. 3, the conveyor 4 includes a conveyance path Pr1 defined as a space surrounded by guide surfaces, which extend to be able to contact one side and the other side of a sheet inside the opening-closing member 9. First, the conveyance path Pr1 includes a portion extending leftward from the supply tray 91 in a substantially horizontal direction. Next, the conveyance path Pr1 includes a portion U-turning downward. Subsequently, the conveyance path Pr1 includes a portion extending short toward the right along the reading surface 82A. Finally, the conveyance path Pr1 includes an obliquely-ascending portion that is slanted upward (relative to a horizontal plane) in a rightward direction and leads to the discharge tray 92.

The conveyor 4 includes a pickup roller 41, a separation roller 42, and a separation pad 42A disposed in respective positions, along the conveyance path Pr1, close to the supply tray 91. The pickup roller 41 is configured to feed one or more sheets placed on the supply tray 91 downstream in a conveyance direction, toward the separation roller 42. The separation roller 42 is configured to, when a plurality of sheets are fed in an overlapping state by the pickup roller 41, separate the sheets on a sheet-by-sheet basis in cooperation with the separation pad 42A, and then convey the sheets further downstream in the conveyance direction.

The conveyor 4 includes a large-diameter conveyance roller 44A and a curved guide surface 44G at the downward U-turning portion of the conveyance path Pr1. An outer circumferential surface of the conveyance roller 44A forms an inner guide surface of the downward U-turning portion of the conveyance path Pr1. The curved guide surface 44G is disposed a predetermined distance apart from the outer circumferential surface of the conveyance roller 44A. The curved guide surface 44G forms an outer guide surface of the downward U-turning portion of the conveyance path Pr1. The conveyance roller 44A is configured to convey one or more sheets to the reading surface 82A in cooperation with pinch rollers 44P and 44Q. The pinch rollers 44P and 44Q are configured to contact the outer circumferential surface of the conveyance roller 44A.

The conveyor 4 includes a pressing member 49 in a position to face the reading surface 82A from above. The pressing member 49 is configured to press, from above, a sheet fed by the conveyance roller 44A and bring the sheet into contact with the reading surface 82A.

The conveyor 4 includes a discharge roller 48 and a pinch roller 48P disposed in respective positions along the obliquely-ascending portion of the conveyance path Pr1, on a right side relative to the pressing member 49. The discharge roller 48 and the pinch roller 48P are positioned upstream relative to the discharge tray 92 in the conveyance direction. The discharge roller 48 and the pinch roller 48P are configured to discharge a sheet having passed over the reading surface 82A onto the discharge tray 92.

In the MFP 1, when the reading unit 3 reads an image of a document supported on the document supporting surface 81A, the scanning mechanism (not shown) of the reading unit 3 operates and moves the reading sensor 3S along the left-toright direction between a position under a left end portion of the document supporting surface 81A and a position under a right end portion of the document supporting surface 81A. Thereby, the reading sensor 3S reads the image of the document supported on the document supporting surface 81A. Thereafter, the scanning mechanism (not shown) moves the reading sensor 3S, which has completed the image reading operation, back to an original position on a left side from a right-side position inside the reading unit 3.

Further, in the MFP 1, when the reading unit 3 reads images of sheets placed on the supply tray 91, the scanning mechanism (not shown) of the reading unit 3 operates and stops the reading sensor 3S in a predetermined reading position under the reading surface 82A. Then, when the conveyor 4 sequentially conveys the sheets on the supply tray 91 along the conveyance path Pr1, the sheets pass over the reading sensor 3S staying in the predetermined reading position while contacting the reading surface 82A. Thereby, the reading sensor 3S reads the images of the sheets passing over the reading sensor 3S. The sheets of which the images have been read are discharged onto the discharge tray 92 by the discharge roller 48 and the pinch roller 48P.

<Image Forming Unit and Sheet Supporter>

As shown in FIG. 4, the image forming unit 5 is disposed on a lower side inside the main body 8. The image forming unit 5 includes a sheet cassette 58, a discharge portion 59, a feeder 51, and an inkjet recording unit 56.

The sheet cassette 58 is disposed at a bottom portion inside the main body 8. The sheet cassette 58 is formed substantially in a box shape having an open upper side. The sheet cassette 58 is configured to accommodate one or more sheets stacked therein.

The discharge portion 59 is a concave portion that is recessed rearward from the front surface of the main body. The discharge portion 59 is disposed lower than the operation panel 8P and higher than the sheet cassette 58. The discharge portion 59 is configured to support one or more sheets, on which images have been formed by the inkjet recording unit 56, discharged by the feeder 51.

The feeder 51 includes a curved feeding path Pw1 and a horizontal feeding path Pw2. The curved feeding path Pw1 and the horizontal feeding path Pw2 are defined as spaces surrounded by guide surfaces (not shown) extending to be able to contact one side and the other side of a sheet inside the main body 8. The curved feeding path Pw1 extends obliquely toward an upper rear side from a rear end portion of the sheet cassette 58, and then is curved upward and turns in a forward direction. The horizontal feeding path Pw2 extends forward in a substantially horizontal direction continuously from the curved feeding path Pw1, and leads to the discharge portion 59. The inkjet recording unit 56 is disposed in a position along the horizontal feeding path Pw2.

The feeder 51 includes an arm 51B and a pickup roller 51A above the sheet cassette 58. A root portion of the arm 51B is rotatable around an axis X51B. The axis X51B is positioned above a middle portion of the sheet cassette 58 in the front-to-rear direction. The arm 51B extends from the axis X51B toward a lower rear side. The pickup roller 51A is rotatably supported by a tip end portion of the arm 51B. The supply roller 51A is disposed to be able to contact a top one of sheets stacked in the sheet cassette 58.

The arm 51B includes a driving force transmission mechanism (not shown) configured to transmit a rotational driving force to the pickup roller 51A and rotate the pickup roller 51A. The pickup roller 51A is brought into pressure contact with an upper surface of the top sheet accommodated in the sheet cassette 58 in response to the arm 51B turning downward. The pickup roller 51A rotates while contacting the top sheet accommodated in the sheet cassette 58, and picks up and feeds the top sheet to the curved feeding path Pw1.

The feeder 51 includes a first feed roller 52A and a pinch roller 52P disposed in respective positions, along the horizontal feeding path Pw2, close to a connection point between the curved feeding path Pw1 and the horizontal feeding path Pw2. The feeder 51 includes a second feed roller 53A and a spur roller 53B disposed in respective positions along a middle portion of the horizontal feeding path Pw2 in the front-to-rear direction. The feeder 51 includes a third feed roller 54A and a spur roller 54B disposed in respective positions to face discharge portion 59 at a downstream end portion of the horizontal feeding path Pw2 in a feeding direction.

There is a platen 42 disposed between the pinch roller 52P and the second feed roller 53A. The platen 42 is a flat plate extending in a substantially horizontal direction. The platen 42 defines the horizontal feeding path Pw2 from beneath.

The first feed roller 52A and the pinch roller 52P are configured to pinch therebetween a sheet fed to the horizontal feeding path Pw2 through the curved feeding path Pw1, and feed the sheet onto the platen 42. The second feed roller 53A and the spur roller 53B are configured to pinch therebetween the sheet having passed over the platen 42 and feed the sheet toward the discharge portion 59. The third feed roller 54A and the spur roller 54B are configured to pinch therebetween the sheet fed by the second feed roller 53A and the spur roller 53B and discharge the sheet onto the discharge portion 59. At this time, the first feed roller 52A, the second feed roller 53A, and the third feed roller 54A are intermittently driven by a driving source (not shown), and intermittently feeds the sheet by a predetermined line feed width.

The inkjet recording unit 56 is disposed between the first feed roller 52A and the spur roller 53B. The inkjet recording unit 56 is opposed to the platen 42 from above across the horizontal feeding path Pw2. The inkjet recording unit 56 is configured to reciprocate along a guiderail (not shown) extending in the left-to-right direction as a main scanning direction (i.e., in a direction from a near side to a far side with respect a paper surface of FIG. 4). It is noted that the "paper surface of FIG. 4" represents a plane surface on which FIG. 4 is drawn.

Each time the sheet, which is intermittently being fed on the platen 42 by the predetermined line feed width, stops, the inkjet recording unit 56 reciprocates along the main scanning direction. In this process, the inkjet recording unit 56 forms an image on the sheet by discharging ink supplied from an ink cartridge (not shown) from nozzles 56N as fine ink droplets.

As shown in FIGS. 4 and 5, in the rear surface 8B of the main body 8, an insertion port 89 is formed. The insertion port 89 is shaped substantially in a rectangular hole elongated in the left-to-right direction. As shown in FIG. 4, in the main body 8, an upper guide surface 89C and a lower guide surface 89D are formed. The upper guide surface 89C is slanted downward (relative to a horizontal plane) in a forward direction from an upper end portion of the insertion port 89. The lower guide surface 89D is slanted downward (relative to a horizontal plane) in a forward direction from a lower end portion of the insertion port 89. The upper guide surface 89C and the lower guide surface 89D extend up to a position close to the connection point between the curved feeding path Pw1 and the horizontal feeding path Pw2.

As shown in FIGS. 1 and 4 to 9, the sheet supporter 7 is disposed on a side close to the rear surface 8B of the main body 8. The sheet supporter 7 is configured to support one or more sheets to be fed to the image forming unit 5 via the insertion port 89 formed in the rear surface 8B of the main body 8.

More specifically, as shown in FIGS. 1 and 4 to 9, a fixing portion 8F is attached to the rear surface 8B of the main body 8. The fixing portion 8F is disposed adjacent to the lower end portion of the insertion port 89. The fixing portion 8F protrudes rearward. The sheet supporter 7 is supported by the fixing portion 8F so as to be swingable around a second axis X2. The second axis X2 is positioned lower than the first axis X1 and as high as the insertion port 89. The second axis X2 extends in the left-to-right direction parallel to the rear surface 8B and the first axis X1.

Figure 7:
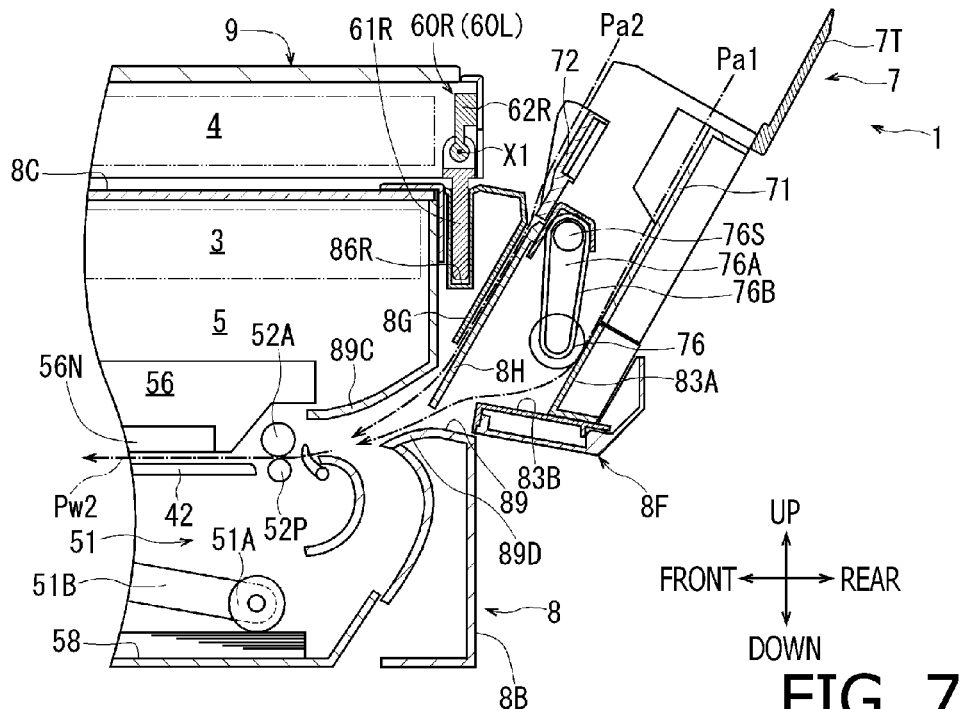
FIG. 7 is a cross-sectional side view schematically showing a state where the sheet supporter is in a second position in the first illustrative embodiment according to one or more aspects of the present disclosure.

As shown in FIGS. 4 and 7, guide members 8G and 8H are attached to the rear surface 8B of the main body 8. The guide members 8G and 8H extend to be slanted upward (relative to a horizontal plane) in a rearward direction from the lower end portion of the insertion port 89. The upper guide member 8G and the lower guide member 8H extend substantially parallel to each other with a gap therebetween in the vertical direction.

The fixing portion 8F includes a separation piece 83B and a first supporting member 83A. The separation piece 83B is positioned as high as the lower end portion of the insertion port 89 in the vertical direction. The separation piece 83B extends rearward from a position close to the lower end portion of the insertion port 89. An upper surface of the separation piece 83B is positioned slightly higher than the lower end portion of the insertion port 89. The upper surface of the separation piece 83B is configured to contact leading ends of one or more sheets supported by the sheet supporter 7. On the upper surface of the separation piece 83B, a plurality of small teeth are formed to protrude upward and arranged in the front-to-rear direction, although they are not shown in any drawings. The teeth are configured to separate the leading ends of the sheets supported by the sheet supporter 7.

The first supporting member 83A is slanted upward (relative to a horizontal plane) in a rearward direction from a rear end portion of the separation piece 83B. The first supporting member 83A is configured to support the leading ends of the sheets supported by the sheet supporter 7, in cooperation with the sheet supporter 7.

At an upper end portion of the lower guide member 8H, a drive shaft 76S is rotatably supported. The drive shaft 76S is driven to rotate by a driving source (not shown). Through the drive shaft 76S, an upper end portion of the arm 76A is inserted. Thereby, the arm 76A is configured to swing around the drive shaft 76S.

The arm 76A extends down toward the first supporting member 83A. A feeding roller 76 is rotatably supported by a lower end portion of the arm 76A. An endless belt 76B is wound around the feeding roller 76 and the drive shaft 76S. The feeding roller 76 is configured to rotate in response to a rotational movement of the drive shaft 76S being transmitted to the feeding roller 76 via the endless belt 76B.

As shown in FIGS. 1, 4, and 6 to 8, the sheet supporter 7 is provided with side walls 7L and 7R, a second supporting member 71, a third supporting member 72, and a lid member 7T. The side walls 7L and 7R are configured to cover the sheet supporter 7 from an outside in the left-to-right direction. Each of the second supporting member 71, the third supporting member 72, and the lid member 7T is formed substantially in a flat plate shape extending in the left-to-right direction over a distance between the left side wall 7L and the right side wall 7R.

As shown in FIGS. 4 and 7, the second supporting member 71 is disposed above an upper end portion of the first supporting member 83A. The third supporting member 72 is disposed above upper end portions of the guide members 8G and 8H. A left corner portion and a right corner portion of a rear end portion (see FIGS. 1 and 4) of the lid member 7T are rotatably supported. The lid member 7T is movable between a position to cover an upper side of the sheet supporter 7 shown in FIGS. 1 and 4 and a position to open the upper side of the sheet supporter 7 shown in FIGS. 7 and 8.

As shown in FIGS. 1, 4, 6, and 9A, the sheet supporter 7 covers the insertion port 89 when being in an upright position to elect upward from the second axis X2, along the rear surface 8B of the main body 8. Hereinafter, the upright position of the sheet supporter 7 shown in FIGS. 1, 4, 6, and 9A may be referred to as a first position.

Figure 8:
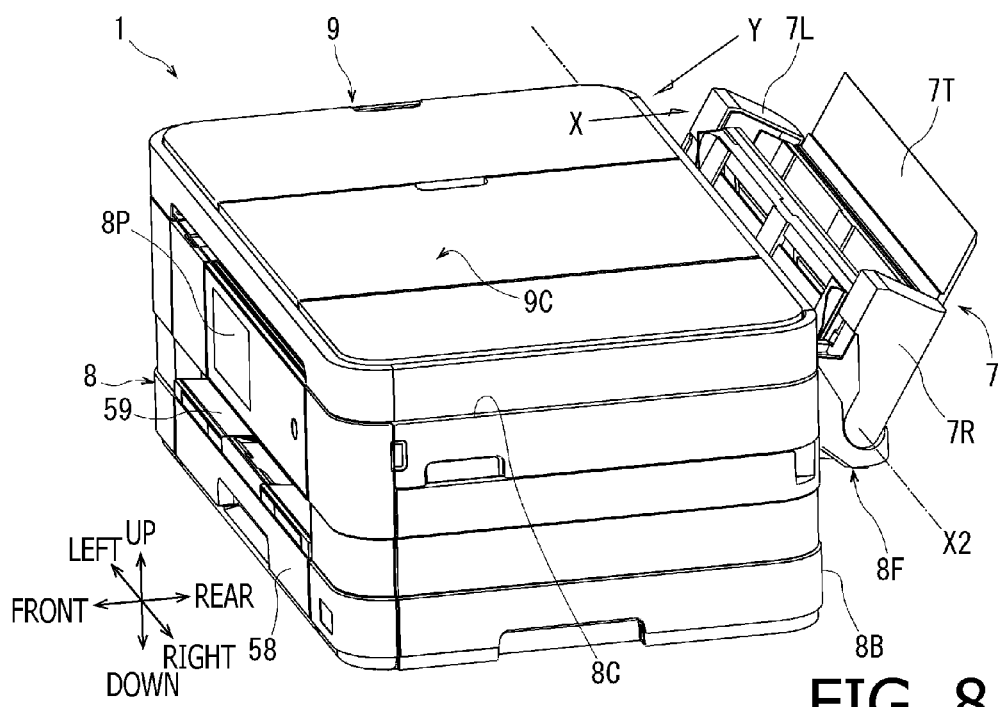
FIG. 8 is a perspective view schematically showing the state where the sheet supporter is in the second position in the first illustrative embodiment according to one or more aspects of the present disclosure.

Meanwhile, as shown in FIGS. 7, 8, and 9B, when the sheet supporter 7 swings rearward from the first position and is slanted rearward relative to the rear surface 8B, the first supporting member 83A and the second supporting member 71 form a substantially continuous flat surface. Thereby, the sheet supporter 7 is allowed to support one or more sheets to be inserted through the insertion port 89. In this state, as show in FIG. 7, a feed path Pa1 is formed as a space defined by a downward-facing surface of the guide member 8H and upward-facing surfaces of the first supporting member 83A and the second supporting member 71. The flat surface formed by the first supporting member 83A and the second supporting member 71 is configured to support a plurality of sheets stacked thereon. The feed path Pa1 passes through the insertion port 89 from behind the rear surface 8B of the main body 8 and leads to the horizontal feeding path Pw2. Hereinafter, the rearward-slanted position of the sheet supporter 7 shown in FIGS. 7, 8, and 9B may be referred to as a second position.

As shown in FIG. 7, when the sheet supporter 7 is in the second position, the guide member 8H and the third supporting member 72 forms a substantially continuous flat surface. A manual feed path Pa2 is formed as a space defined by a downward-facing surface of the guide member 8G and upward-facing surfaces of the guide member 8H and the third supporting member 72. The flat surface formed by the guide member 8H and the third supporting member 72 is configured to support a single sheet manually fed. The manual feed path Pa2 passes through the insertion port 89 from behind and leads to the horizontal feeding path Pw2.

As shown in FIGS. 9A, 9B, and 10, an urging unit 77 is disposed between the fixing portion 8F and the sheet supporter 7. The urging unit 77 includes a cam 77, a cam follower 77A, and a coil spring 77C.

The cam 78 is provided to the fixing portion 8F. As shown in FIGS. 9A and 9B, the cam 78 is covered with the right side wall 7R of the sheet supporter 7 from the right. As shown in FIG. 9B, the cam 78 is formed integrally with a supporting portion 8E. The supporting portion 8E protrudes upward from a right end portion of the fixing portion 8F. The cam 78 is a rib formed in an arc with the second axis X2 as a center, in a side view. As shown in FIG. 10, the cam 78 protrudes leftward in a substantially triangle shape in a plane view. The cam 78 has a vertex 78C, a slanted surface 78A, and a slanted surface 78B. The slanted surface 78A extends toward a front right side from the vertex 78C. In other words, the slanted surface 78A is slanted rightward in a forward direction from the vertex 78C, in the plane view. The slanted surface 78B extends toward a rear right side from the vertex 78C. In other words, the slanted surface 78B is slanted rightward in a rearward direction from the vertex 78C, in the plane view.

The cam follower 77A and the coil spring 77C are provided to the sheet supporter 7. In FIGS. 9A and 9B, the cam follower 77A and the coil spring 77C are positioned on a far side of a paper surface relative to the cam 78. It is noted that the "paper surface" represents a plane surface on which FIGS. 9A and 9B are drawn. The cam follower 77A is supported by the sheet supporter 7 to be movable along the left-to-right direction, although a detailed configuration about that is not shown in any drawings. As shown in FIG. 10, the coil spring 77C is disposed between the cam follower 77A and the sheet supporter 7 and configured to urge the cam follower 77A against the cam 78. In other words, the coil spring 77C presses the cam 78 from the left.

When the sheet supporter 7 in the first position shown in FIG. 9A swings around the second axis X2 and moves to the second position shown in FIG. 9B, the cam follower 77 and the coil spring 77C move together with the sheet supporter 7. Meanwhile, the cam 78 provided to the fixing portion 8F does not move. Therefore, as shown in FIG. 10, the cam follower 77A rotates and moves rearward along the slanted surface 78A. In a process that the cam follower 77A reaches the vertex 78, the coil spring 77C is compressed. Meanwhile, in a process that the cam follower 77A rotates and moves rearward from the vertex 78 along the slanted surface 78B, the coil spring 77C extends.

An inclination angle α of the sheet supporter 7 relative to the rear surface 8B when the cam follower 77A is in contact with the vertex 78C of the cam 78 is set to a predetermined angle α1 shown in FIG. 9B. As shown in FIG. 9B, when the inclination angle α is larger than the predetermined angle α1, the cam follower 77A is pressed against the slanted surface 78B, and the sheet supporter 7 is urged toward the second position. Meanwhile, when the inclination angle α is smaller than the predetermined angle α1, the cam follower 77A is pressed against the slanted surface 78A, and the sheet supporter 7 is urged toward the first position.

Owing to the urging unit 77, when the sheet supporter 7 is swung around the second axis X2, the position of the sheet supporter 7 is set to one of the first position and the second position.

In the MFP 1, when image formation is performed on a sheet placed in the sheet cassette 58, as shown in FIG. 4, the image forming unit 5 is controlled by a controller (not shown) such that the pickup roller 51A picks up the sheet in the sheet cassette 58 and feeds the sheet to the curved feeding path Pw1. Then, the first feed roller 52A, the second feed roller 53A, the third feed roller 54A, and the inkjet recording unit 56 operate in cooperation with each other, and form the image on the sheet while feeding the sheet along the horizontal feeding path Pw2. The sheet with the image formed thereon is discharged onto the discharge portion 59.

Further, in the MFP 1, when image formation is performed on a sheet other than sheets placed in the sheet cassette 58, as shown in FIG. 7, the sheet supporter 7 is moved to the second position. Then, when image formation is performed on a plurality of sheets set on the second supporting member 71 of the sheet supporter 7, the feeding roller 76 is controlled by the controller (not shown) to rotate in contact with a top one of the sheets supported by the second supporting member 71 of the sheet supporter 7. Thereby, the top sheet is fed along the feed path Pa1, and reaches the horizontal feeding path Pw2. Further, when image formation is performed with a single sheet manually set on the third supporting member 72 of the sheet supporter 7, the user inserts the sheet along the manual feed path Pa2, and causes a leading end of the sheet to reach the horizontal feeding path Pw2. When the leading end of the sheet reaches the horizontal feeding path Pw2, the state is detected by a position detection sensor (not shown), and a detection signal is transmitted to the controller (not shown).

The image forming unit 5 is controlled by the controller (not shown) to form an image on the sheet fed on the horizontal feeding path Pw2 via the feed path Pa1 or the manual feed path Pa2. Then, the sheet with the image formed thereon is discharged onto the discharge portion 59.

<Interlocking Mechanism and Link Mechanism>

Figure 13:
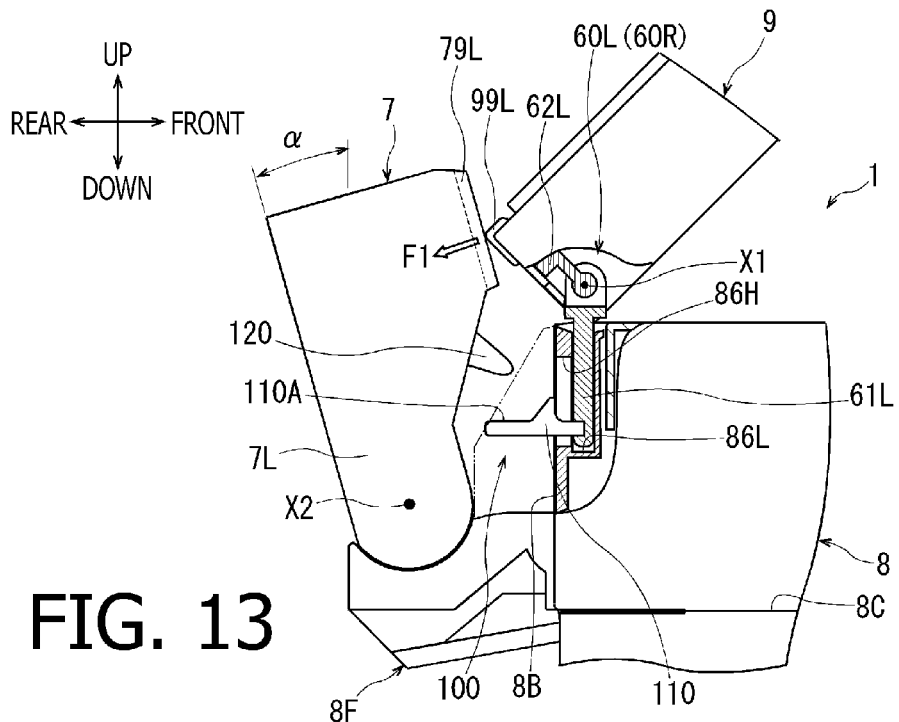
FIGS. 13 and 14 are side views for illustrating operations of the hinges, the link mechanism, the contacting portion, and the contacted portion of the MFP in the first illustrative embodiment according to one or more aspects of the present disclosure.
Figure 14:
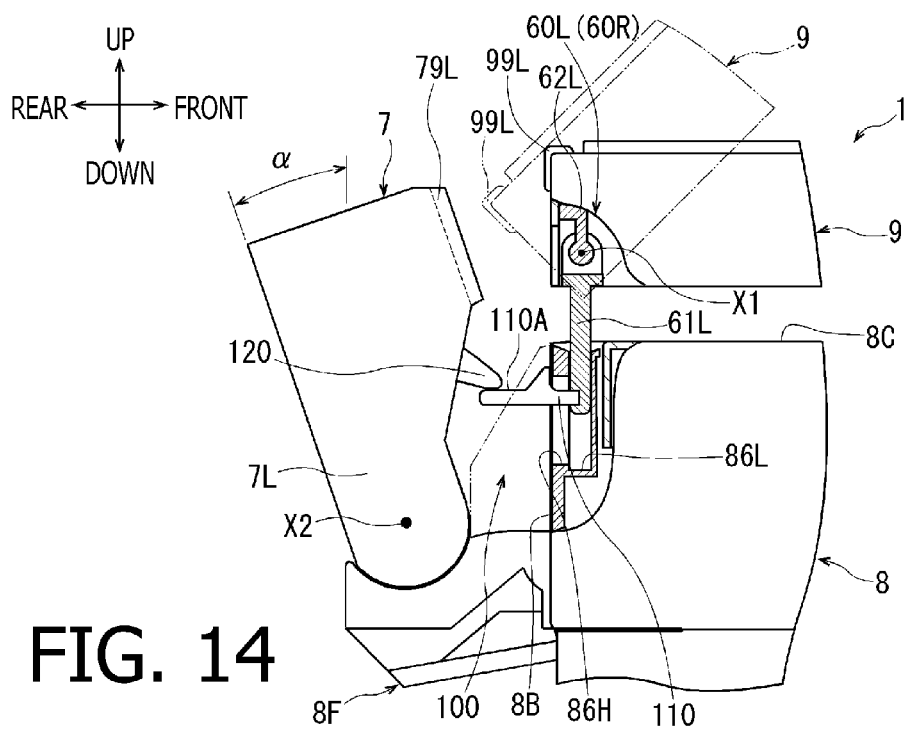

As shown in FIG. 6, on a trajectory K1 of the opening-closing member 9 swinging around the first axis X1, the sheet supporter 7 in the first position exists. Therefore, the MFP 1 includes an interlocking mechanism configured to move the sheet supporter 7 from the first position to the second position in conjunction with the opening-closing mechanism 9 swinging around the first axis X1 from the closed position to the open position. The interlocking mechanism includes contacting portions 99L and 99R shown in FIGS. 5, 6, and 11, and contacted portions 79L and 79R shown in FIGS. 5, 6, and 12. Further, as shown in FIGS. 6, 13, and 14, the MFP 1 includes a link mechanism 100 configured to, when the bases 61L and 61R move up, displace the sheet supporter 7 to the second position in conjunction with an upward movement of the left base 61L.

Figure 11:
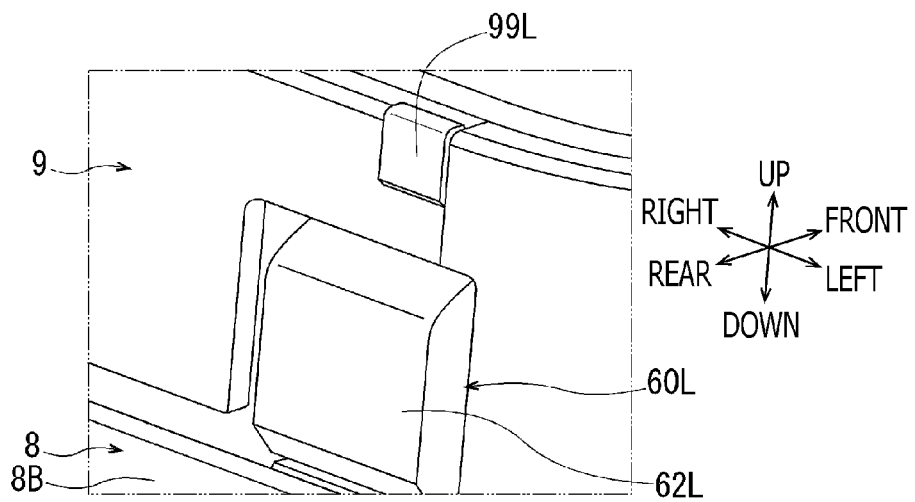
FIG. 11 is a perspective view showing the contacting portion when viewed in a direction of an arrow Y shown in FIG. 8, in the first illustrative embodiment according to one or more aspects of the present disclosure.

As shown in FIGS. 5, 6, and 11, the contacting portions 99L and 99R are formed at the opening-closing member 9. In FIG. 11, the left contacting portion 99L is only shown. The right contacting portion 99R is configured in substantially the same manner as the left contacting portion 99L, except for having a mirror-symmetrical structure to the left contacting portion 99L with respect to a plane perpendicular to the left-to-right direction. Hence, a detailed explanation about the right contacting portion 99R will be omitted. The left contacting portion 99L is formed integrally with a portion, of a rear surface of the opening-closing member 9, which is positioned higher than the rotatable portion 62L of the hinge 60L. Likewise, the right contacting portion 99R is formed integrally with a portion, of the rear surface of the opening-closing member 9, which is positioned higher than the rotatable portion 62R of the hinge 60R. Each of the contacting portions 99L and 99R is formed to protrude rearward from the rear surface of the opening-closing member 9, in a substantially trapezoid shape in a side view. As shown in FIG. 6, the left contacting portion 99L protrudes toward an upper portion of a front surface of the side wall 7L. Likewise, the right contacting portion 99R protrudes toward an upper portion of a front surface of the side wall 7R.

Namely, the contacting portions 99L and 99R protrude toward an upper end portion of the sheet supporter 7 in the state where the opening-closing member 9 is in the closed position. Further, as shown in FIG. 11, the contacting portions 99L and 99R protrude upward from an upper end of the rear surface of the opening-closing member 9.

Figure 12:
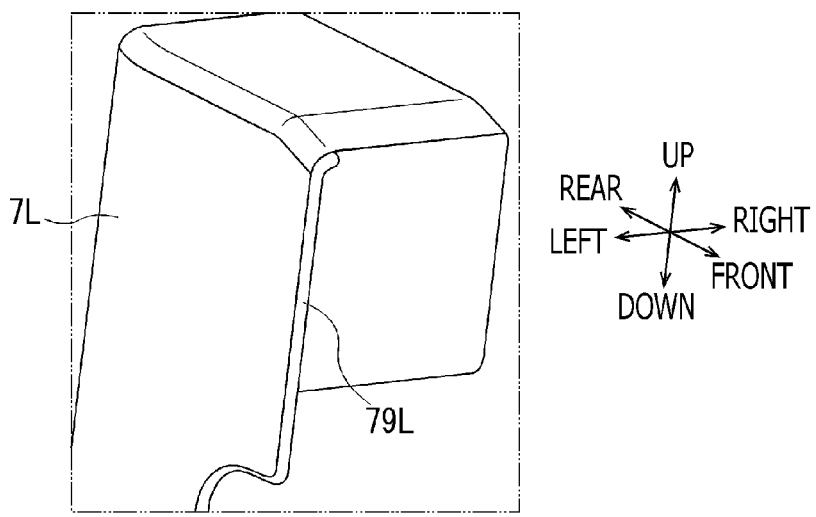
FIG. 12 is a perspective view showing the contacted portion when viewed in a direction of an arrow X shown in FIG. 8, in the first illustrative embodiment according to one or more aspects of the present disclosure.

As shown in FIGS. 5 and 12, the contacted portions 79L and 79R are formed at the upper end portion of the sheet supporter 7. In FIG. 12, the left contacted portion 79L is only shown. The right contacted portion 79R is configured in substantially the same manner as the left contacted portion 79L, except for having a mirror-symmetrical structure to the left contacted portion 79L with respect to a plane perpendicular to the left-to-right direction. Hence, a detailed explanation about the right contacted portion 79R will be omitted. The left contacted portion 79L is formed integrally with an upper portion of a front surface of the left side wall 7L. Likewise, the right contacted portion 79R is formed integrally with an upper portion of a front surface of the right side wall 7R. The left contacted portion 79L is a rib that vertically extends along a left end portion of the front surface of the left side wall 7L and protrudes frontward. Likewise, the right contacted portion 79R is a rib that vertically extends along a right end portion of the front surface of the right side wall 7R and protrudes frontward.

Namely, when the sheet supporter 7 is in the first position, the left contacted portion 79L protrudes toward the left contacting portion 99L of the opening-closing member 9 in the closed position 9, and extends in the vertical direction that is substantially perpendicular to the second axis X2 along the left-to-right direction. Likewise, when the sheet supporter 7 is in the first position, the right contacted portion 79R protrudes toward the right contacting portion 99R of the opening-closing member 9 in the closed position 9, and extends in the vertical direction.

As shown in FIG. 13, in a state where the bases 61L and 61R of the hinges 60L and 60R are not displaced upward relative to the main body 8, when the opening-closing member 9 moves to the open position, the contacting portions 99L and 99R move and slide in contact with the contacted portions 79L and 79R while drawing arc trajectories around the second axis X2, respectively. It is noted that any portions of the opening-closing member 9 other than the contacting portions 99L and 99R do not slide in contact with any portions of the sheet supporter 7 other than the contacted portions 79L and 79R.

Via the contacting portions 99L and 99R and the contacted portions 79L and 79R, a pressing force F1 is applied to the sheet supporter 7 in response to the movement of the opening-closing member 9 to the open position. Consequently, the sheet supporter 7 is retracted from the first position to the second position in response to the movement of the opening-closing member 9 to the open position. A direction of the pressing force F1 changes depending on respective positions of the contacting portions 99L and 99R sliding in contact with the contacted portions 79L and 79R and/or respective contact states between the contacting portions 99L and 99R and the contacted portions 79L and 79R. Nevertheless, as shown in FIG. 13, the pressing force F1 is oriented in a circumferential direction around the second axis X2.

At this time, in FIG. 13, the inclination angle α of the sheet supporter 7 relative to the rear surface 8B is set to be smaller than the predetermined angle α1. Therefore, for instance, as shown in FIG. 6 when the opening-closing member 9 moves to the closed position, the sheet supporter 7 is automatically moved back to the first position from the position shown in FIG. 13, by the urging force of the urging unit 77.

As shown in FIG. 14, the link mechanism 100 is disposed between the left base 61L and the sheet supporter 7. The link mechanism 100 includes an operational portion 110 and a transmitting portion 120.

The main body 8 has an opening 86H that penetrates to the rear surface 8B from a rear wall surface of the holding hole 86L configured such that the left base 61L is inserted thereinto. The opening 86H extends in the vertical direction.

As shown in FIGS. 5 and 6, the operational portion 110 is a resin member attached to a rear surface of the left base 61L. The operational portion 110 protrudes rearward from the rear surface of the left base 61L, passes through the opening 86H, and extends toward the sheet supporter 7. A contact surface 110A, facing upward behind the opening 86H, of the operational portion 110 is slanted downward (relative to a horizontal plane) in a rearward direction, and thereafter extends in a substantially horizontal direction.

As shown in FIG. 14, for instance, when the opening-closing member 9 moves to the closed position in a state where a thick document is supported on the document supporting surface 81A, and the bases 61L and 61R of the hinges 60L and 60R move upward together with the first axis X1 relative to the main body 8, the operational portion 110 moves upward together with the left base 61L. Then, as shown in FIG. 6, when the bases 61L and 61R move downward to their original positions, the operational portion 110 moves downward together with the left base 61L.

As shown in FIGS. 6 and 14, the transmitting portion 120 is disposed at the sheet supporter 7. More specifically, the transmitting portion 120 is a resin member attached to the side wall 7L. The transmitting portion 120 protrudes toward a lower front side from an inner wall surface of the side wall 7L. As shown in FIG. 6, in the state where the bases 61L and 61R of the hinges 60L and 60R are not displaced upward relative to the main body 8, the transmitting portion 120 is in contact with the contact surface 110A of the operational portion 110 from above, or is slightly spaced apart from the contact surface 110A. Then, as shown in FIG. 14, when the bases 61L and 61R of the hinges 60L and 60R move upward together with the first axis X1 relative to the main body 8, and the operational portion 110 moves upward together with the left base 61L, the transmitting portion 120 is pushed up while contacting the contact surface 110A of the operational portion 110. Thereby, the transmitting portion 120 transmits displacement of the operational portion 110 to the sheet supporter 7, and causes the sheet supporter 7 to swing around the second axis X2 toward the second position.

At this time, in FIG. 14, the inclination angle α of the sheet supporter 7 relative to the rear surface 8B is set to be smaller than the predetermined angle α1. Therefore, for instance, as shown in FIG. 6, when the opening-closing member 9 moves to the closed position, the sheet supporter 7 is automatically moved back to the first position from the position shown in FIG. 14 by the urging force of the urging unit 77.

Figure 15:
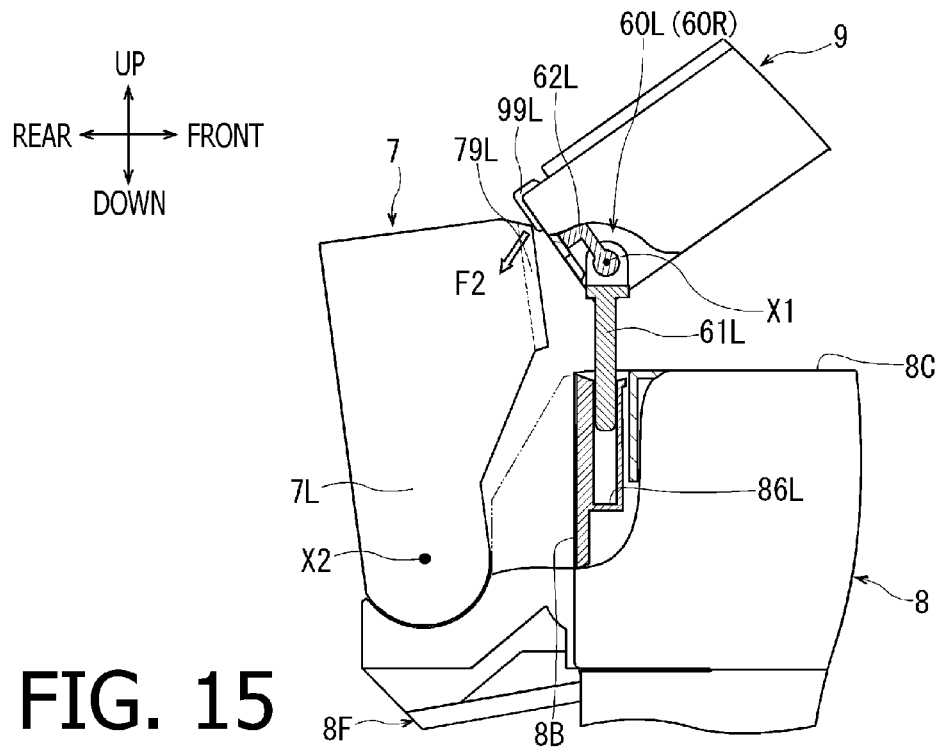
FIG. 15 is a side view schematically showing a comparative example that is equivalent to the MFP of the first illustrative embodiment from which the link mechanism is eliminated.

FIG. 15 shows a comparative example that is equivalent to the MFP 1 of the first illustrative embodiment from which the link mechanism 100 is eliminated. In the comparative example, when the bases 61L and 61R of the hinges 60L and 60R move upward relative to the main body 8, and the opening-closing member 9 swings around the first axis X1 that is positioned above and apart from the main body 8 and the second axis X2, the contacting portions 99L and 99R formed at the opening-closing member 9 are likely to contact upper end corner portions of the sheet supporter 7 in the first position. In this case, a pressing force F2, of which a direction is changed from a circumferential direction around the second axis X2 to a radially inward direction, is likely to act on the upper end corner portions of the sheet supporter 7. In other words, the pressing force F2 is oriented in such a compression direction as to compress an upper end portion of the sheet supporter 7 toward the second axis X2. When the opening-closing member 9 and the sheet supporter 7 excessively press each other by the pressing force F2, it might lead to undesired problems such as malfunctions and damages in the opening-closing member 9 and the sheet supporter 7.

It is noted that the inclination angle α of the sheet supporter 7 shown in FIG. 14 is an example. The inclination angle α of the sheet supporter 7 retracted by the link mechanism 100 does not necessarily have to be as large as such an angle as to completely avoid interference (contact) with the opening-closing member 9 in the open position. The inclination angle α of the sheet supporter 7 may be as small as such an angle as to accept a mild degree of interference between the opening-closing member 9 in the open position and the retracted sheet supporter 7 but avoid an excessive pressing force applied between the opening-closing member 9 and the sheet supporter 7.

<Operations and Advantageous Effects>

As shown in FIG. 6, in the MFP 1 of the first illustrative embodiment, the sheet supporter 7 in the first position in on the trajectory K1 of the opening-closing member 9 swinging around the first axis X1. Thus, it is possible to attain miniaturization of the MFP 1 by disposing the opening-closing member 9 and the sheet supporter 7 close to each other.

As shown in FIG. 13, in the MFP 1, in the state where the bases 61L and 61R are not displaced upward relative to the main body 8, when the opening-closing member 9 moves to the open position, the contacting portions 99L and 99R formed at the opening-closing member 9 slide in contact with the contacted portions 79L and 79R formed at the upper end portion of the sheet supporter 7 in the first position. Therefore, the pressing force F1, which is oriented substantially in a circumferential direction around the second axis X2, is applied from the opening-closing member 9 to the sheet supporter 7 supported by the main body 8 to be swingable around the second axis X2. Thereby, the sheet supporter 7 is moved to the second position. Namely, in response to the opening-closing member 9 moving to the open position, the sheet supporter 7 is retracted from the first position to the second position. Thus, it is possible to prevent an excessive pressing force from being applied to the sheet supporter 7 from the opening-closing member 9.

Further, as shown in FIGS. 6 and 14, in the MFP 1, the link mechanism 100 is disposed between the left base 61L and the sheet supporter 7. As shown in FIG. 14, the link mechanism 100 is configured to, when the bases 61L and 61R move upward, cause the sheet supporter 7 to move to the second position in conjunction with the upward movement of the left base 61L. More specifically, the operational portion 110 extending from the left base 61L to the sheet supporter 7 moves upward together with the left base 61L. Then, the transmitting portion 120 provided to the sheet supporter 7 is lifted up in contact with the contact surface 110A of the operational portion 110. Thereby, the transmitting portion 120 transmits the upward movement of the operational portion 110 to the sheet supporter 7, and causes the sheet supporter 7 to move to the second position.

Thus, the sheet supporter 7 is retracted from the first position to the second position in conjunction with the upward movement of the left base 61L. Thereby, in the MFP 1, as shown in FIG. 14, when the bases 61L and 61R of the hinges 60L and 60R move upward relative to the main body 8, a pressing force, of which direction is changed from a circumferential direction around the second axis X2 to a radially inward direction, is prevented from being applied to an upper end portion of the sheet supporter 7 from the opening-closing member 9 swinging around the first axis X1 that is positioned above and apart from the main body 8 and the second axis X2. For example, as shown in FIG. 15, it is possible to prevent the pressing force F2 in such a compression direction as to compress the upper end portion of the sheet supporter 7 toward the second axis X2. Consequently, in the MFP 1, it is possible to prevent an excessive pressing force from being applied to the sheet supporter 7 from the opening-closing member 9 and to prevent undesired problems such as malfunctions and damages in the opening-closing member 9 and the sheet supporter 7.

Further, in the MFP 2, the opening-closing member 9 is moved in the vertical direction by the hinges 60L and 60R depending on a thickness of a document. Hence, the trajectory of the opening-closing member 9 swinging to the open position varies depending on the thickness of the document. Nevertheless, regardless of the change in the trajectory, the sheet supporter 7 is retracted from the first position to the second position in conjunction with the upward movement of the bases 61L and 61R. Therefore, according to the MFP 1, a degree of freedom for laying out the sheet supporter 7 is less likely to be limited in comparison to a known MFP.

Thus, according to the MFP 1 of the first illustrative embodiment, it is possible to realize miniaturization of the MFP 1 and prevent undesired problems such as malfunctions and damages in the opening-closing member 9 and the sheet supporter 7.

Further, in the MFP 1, as shown in FIGS. 13 and 14, the inclination angle $\alpha$ of the sheet supporter 7 refracted by the interlocking mechanism or the link mechanism 100 is smaller than the predetermined angle $\alpha 1$. Thereby, in the MFP 1, when the opening-closing member 9 moves to the closed position, or when the bases 61L and 61R of the hinges 60L and 60R move downward, it is possible to automatically move the sheet supporter 7 back to the first position by the urging force of the urging unit 77.

Further, in the MFP 1, it is possible to certainly move the sheet supporter 7 to the second position in conjunction with the upward movement of the left base 61L, with the simple mechanism, i.e., the operational portion 110 and the transmitting member 120 included in the link mechanism 100.

Further, in the MFP 1, when the opening-closing member 7 swings and comes into contact with the sheet supporter 7, the contacting portions 99L and 99R come into contact with the contacted portions 79L and 79R. Therefore, it is less likely that scratch marks will be formed on portions other than the contacting portions 99L and 99R and the contacted portions 79L and 79R. Thus, according to the MFP 1, it is possible to prevent degradation in the appearance quality due to scratch marks.

Second Illustrative Embodiment

Figure 16:
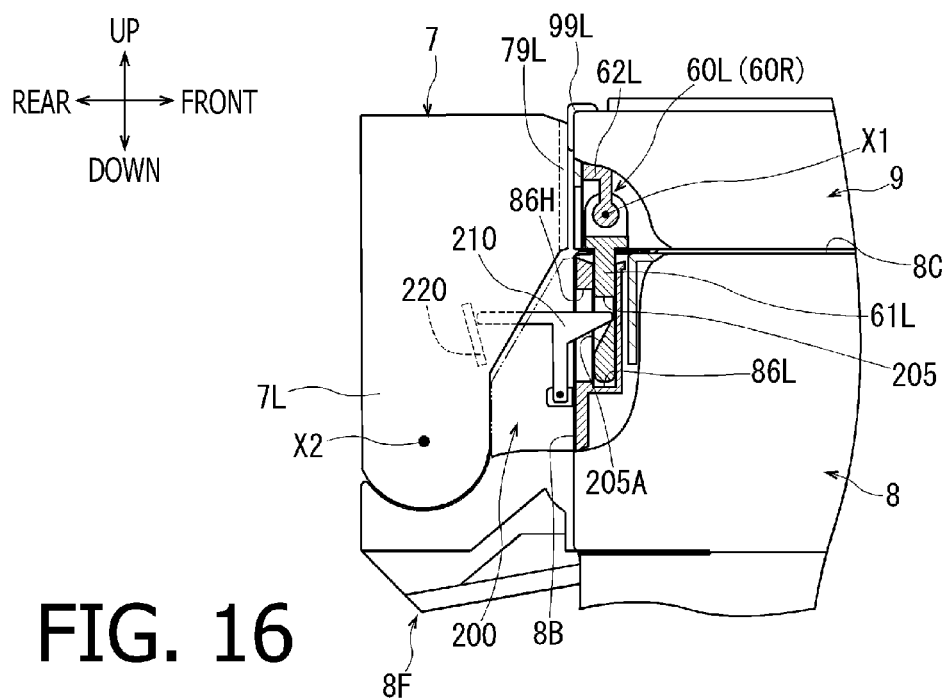
FIGS. 16 and 17 are side views for illustrating operations of hinges, a link mechanism, a contacting portion, and a contacted portion of an MFP in a second illustrative embodiment according to one or more aspects of the present disclosure.
Figure 17:
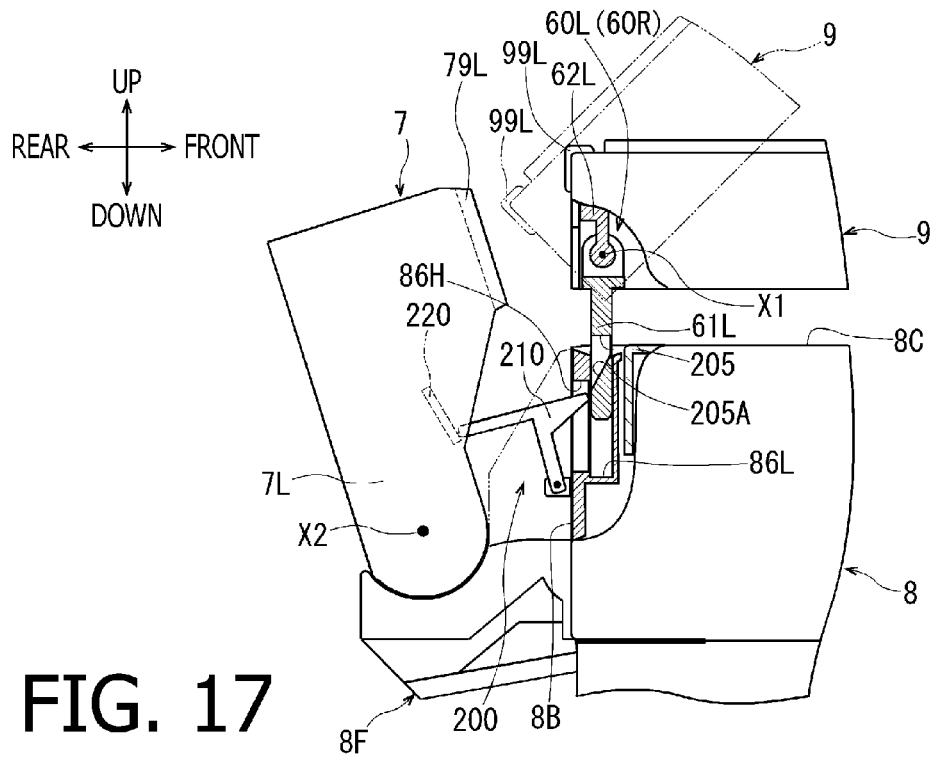

In an MFP of a second illustrative embodiment, a link mechanism 200 shown in FIGS. 16 and 17 is employed instead of the link mechanism 100 of the MFP 1 in the first illustrative embodiment. Other elements other than the link mechanism 200 in the second illustrative embodiment are substantially the same as those in the first illustrative embodiment. Therefore, the same elements will be provided with the same reference characters, and detailed explanations about them will be omitted.

As shown in FIG. 16, the link mechanism 200 is disposed between the left base 61L and the sheet supporter 7. The link mechanism 200 includes a link hole 205, an operational lever 210, and a transmitting portion 220.

The link hole 205 is formed in the left base 61L. The link hole 205 is positioned on a front side relative to the opening 86H. The link hole 205 penetrates in the front-to-rear direction. A lower-side inner wall surface of the link hole 205 is a contact surface 205A that is slanted downward in a rearward direction.

The operational lever 210 is disposed on the rear surface 8B. The operational lever 210 is formed substantially in a T-shape in a side view. A downward-protruding portion of the operational lever 210 is swingably supported by the rear surface 8B, below the holding hole 86L. A frontward-protruding portion of the operational lever 210 is inserted into the link hole 205 and contacts the contact surface 205A. A rearward-protruding portion of the operational lever 210 extends long toward the sheet supporter 7.

The transmitting portion 220 is a rib that is formed on the inner wall surface of the side wall 7L and extends in the vertical direction. The transmitting portion 220 is urged by the urging unit 77 and contacts the rearward-protruding portion of the operational lever 210.

As shown in FIG. 17, when the bases 61L and 61R of the hinges 60L and 60R move upward together with the first axis X1 relative to the main body 8, the frontward-protruding portion of the operational lever 210 is pushed upward by the contact surface 205A of the link hole 205 of the left base 61L. Then, the transmitting portion 220 is pressed by the rearward-protruding portion of the swinging operational lever 210. Thereby, the transmitting portion 220 transmits displacement of the operational lever 210, and causes the sheet supporter 7 to swing around the second axis X2 and move to the second position.

The MFP of the second illustrative embodiment configured as above provides substantially the same operations and advantageous effects as the MFP 1 of the first illustrative embodiment.

Third Illustrative Embodiment

Figure 18:
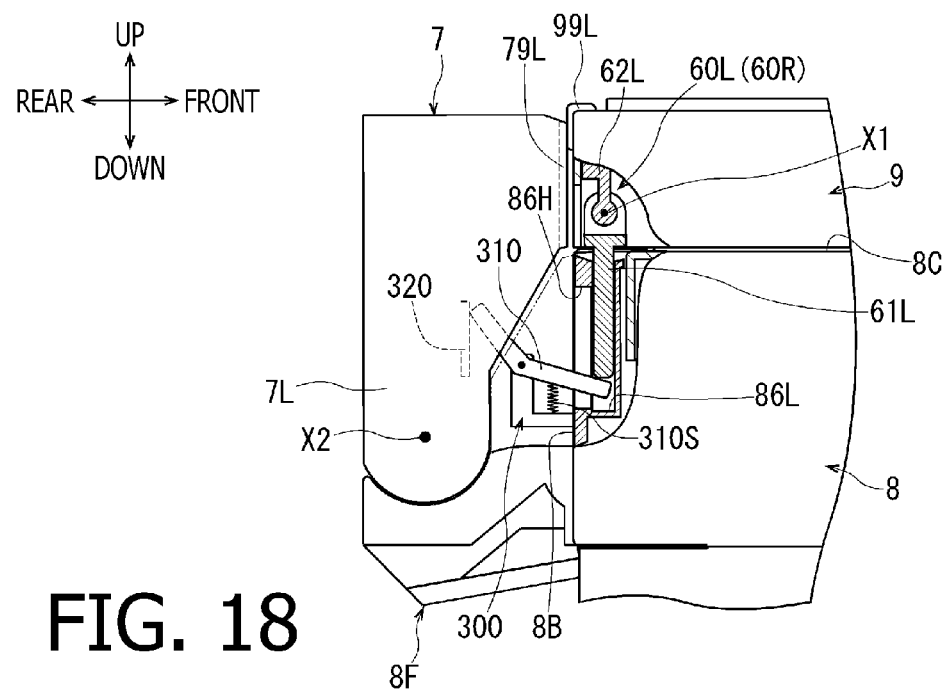
FIGS. 18 and 19 are side views for illustrating operations of hinges, a link mechanism, a contacting portion, and a contacted portion of an MFP in a third illustrative embodiment according to one or more aspects of the present disclosure.
Figure 19:
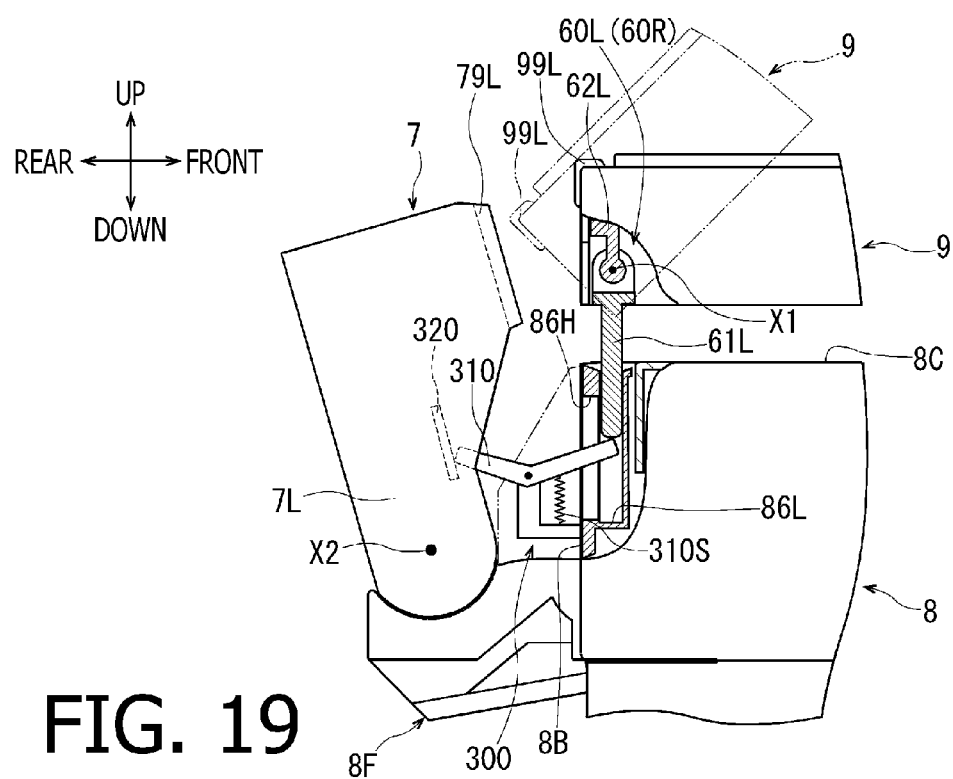

In an MFP of a third illustrative embodiment, a link mechanism 300 shown in FIGS. 18 and 19 is employed instead of the link mechanism 100 of the MFP 1 in the first illustrative embodiment. Other elements other than the link mechanism 300 in the third illustrative embodiment are substantially the same as those in the first illustrative embodiment. Therefore, the same elements will be provided with the same reference characters, and detailed explanations about them will be omitted.

As shown in FIG. 18, the link mechanism 300 is disposed between the left base 61L and the sheet supporter 7. The link mechanism 300 includes an operational lever 310, and a transmitting portion 320. Further, in the third illustrative embodiment, the holding hole 86L and the opening 86H are extended downward longer than the first illustrative embodiment.

The operational lever 310 is disposed on rear surface 8B. The operational lever 310 is formed substantially in a V-shape in a side view. A middle bent portion of the operational lever 310 is swingably supported by the rear surface 8B, behind the holding hole 86L. The operational lever 310 is urged by a compression coil spring 310S to be swingable counterclockwise in a left side view (i.e., when viewed from the left). A frontward-protruding portion of the operational lever 310 is inserted into the opening 86H, and contacts a lower end face of the left base 61L. A rearward-protruding portion of the operational lever 310 extends long toward the sheet supporter 7. As far as the operational lever 310 is urged in the same direction, any other urging member such as a torsion coil spring may be employed instead of the compression coil spring 310S.

The transmitting portion 320 is a rib that is formed on the inner wall surface of the side wall 7L and extends in the vertical direction. The transmitting portion 320 is urged by the urging unit 77 and contacts the rearward-protruding portion of the operational lever 310.

As shown in FIG. 19, when the bases 61L and 61R of the hinges 60L and 60R move upward together with the first axis X1 relative to the main body 8, the frontward-protruding portion of the operational lever 310 is urged by the compression coil spring 310S, and follows the lower end face of the left base 61L moving upward. Then, the transmitting portion 320 is pressed by the rearward-protruding portion of the swinging operational lever 210. Thereby, the transmitting portion 320 transmits displacement of the operational lever 310, and causes the sheet supporter 7 to swing around the second axis X2 and move to the second position.

The MFP of the third illustrative embodiment configured as above provides substantially the same operations and advantageous effects as the MFP 1 of the first illustrative embodiment and the MFP of the second illustrative embodiment.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

(Modifications)

A link mechanism according to aspects of the present disclosure is not limited to the link mechanisms 100, 200, and 300 exemplified in the first to third illustrative embodiments, respectively. For instance, a link mechanism may be configured to cause a sheet supporter to move to the second position by a repellent force acting between a first magnet attached to a base and a second magnet attached to the sheet supporter when the base moves upward, and the first magnet and the second magnet become closer to each other in the vertical direction.

What is claimed is:
1. A multi-function peripheral comprising:
   a main body having:
      a document supporting surface formed on an upper surface of the main body, the document supporting surface being configured to support thereon a document to be read; and
      an insertion port formed in a side surface of the main body, the insertion port being configured such that a sheet for image formation is inserted through the insertion port;
   a reading unit disposed inside the main body, the reading unit being configured to read an image of the document supported on the document supporting surface;
   an image forming unit disposed inside the main body, the image forming unit being configured to form an image on the sheet inserted through the insertion port;
   an opening-closing member supported by the main body to be swingable around a first axis parallel to the side surface of the main body, the opening-closing member being configured to move between a closed position to cover the document supporting surface and an open position to expose the document supporting surface;
   a sheet supporter supported by the main body to be swingable around a second axis parallel to the first axis, the sheet supporter being configured to move between:

a first position where the sheet supporter covers the insertion port and is on a trajectory of the opening-closing member swinging around the first axis; and a second position where the sheet supporter is slanted relative to the side surface of the main body and supports the sheet to be inserted through the insertion port;

a hinge disposed between the main body and the opening-closing member, the hinge being configured to define the first axis around which the opening-closing member is swingably supported via the hinge, the hinge comprising:

a base attached to the main body to be movable in a vertical direction together with the first axis; and a link mechanism disposed between the base and the sheet supporter, the link mechanism being configured to move the sheet supporter to the second position in conjunction with an upward movement of the base.

2. The multi-function peripheral according to claim 1, further comprising an urging unit disposed between the main body and the sheet supporter, the urging unit being configured to urge the sheet supporter toward the first position when an inclination angle of the sheet supporter relative to the side surface of the main body is smaller than a predetermined angle.

3. The multi-function peripheral according to claim 1, wherein the link mechanism comprises:

an operational portion extending from the base toward the sheet supporter, the operational portion being configured to move in the vertical direction together with the base; and a transmitting portion disposed at the sheet supporter, the transmitting portion being configured to contact the operational portion moving upward, transmit displacement of the operational portion to the sheet supporter, and move the sheet supporter toward the second position.

4. The multi-function peripheral according to claim 2, wherein the link mechanism comprises:

an operational portion extending from the base toward the sheet supporter, the operational portion being configured to move in the vertical direction together with the base; and a transmitting portion disposed at the sheet supporter, the transmitting portion being configured to contact the operational portion moving upward, transmit displacement of the operational portion to the sheet supporter, and move the sheet supporter toward the second position.

5. The multi-function peripheral according to claim 1, wherein the link mechanism comprises:

an operational portion disposed at the main body, the operational portion being configured to move in conjunction with the upward movement of the base; and a transmitting portion disposed at the sheet supporter, the transmitting portion being configured to contact the operational portion moving in conjunction with the upward movement of the base, and cause the sheet supporter to move toward the second position.

6. The multi-function peripheral according to claim 2, wherein the link mechanism comprises:

an operational portion disposed at the main body, the operational portion being configured to move in conjunction with the upward movement of the base; and a transmitting portion disposed at the sheet supporter, the transmitting portion being configured to contact the operational portion moving in conjunction with the upward movement of the base, and cause the sheet supporter to move toward the second position.

7. The multi-function peripheral according to claim 1, further comprising:

a contacting portion disposed at the opening-closing member, the contacting portion being formed to, when the opening-closing member is in the closed position, protrude toward an upper end portion of the sheet supporter in the first position; and a contacted portion disposed at the upper end portion of the sheet supporter, the contacted portion being formed to, when the sheet supporter is in the first position, protrude toward the contacting portion of the opening-closing member in the closed position and extend in a direction perpendicular to the second axis, the contacted portion being configured such that the contacting portion slides in contact with the contacted portion when the opening-closing member moves to the open position.

8. The multi-function peripheral according to claim 2, further comprising:

a contacting portion disposed at the opening-closing member, the contacting portion being formed to, when the opening-closing member is in the closed position, protrude toward an upper end portion of the sheet supporter in the first position; and a contacted portion disposed at the upper end portion of the sheet supporter, the contacted portion being formed to, when the sheet supporter is in the first position, protrude toward the contacting portion of the opening-closing member in the closed position and extend in a direction perpendicular to the second axis, the contacted portion being configured such that the contacting portion slides in contact with the contacted portion when the opening-closing member moves to the open position.

9. The multi-function peripheral according to claim 3, further comprising:

a contacting portion disposed at the opening-closing member, the contacting portion being formed to, when the opening-closing member is in the closed position, protrude toward an upper end portion of the sheet supporter in the first position; and a contacted portion disposed at the upper end portion of the sheet supporter, the contacted portion being formed to, when the sheet supporter is in the first position, protrude toward the contacting portion of the opening-closing member in the closed position and extend in a direction perpendicular to the second axis, the contacted portion being configured such that the contacting portion slides in contact with the contacted portion when the opening-closing member moves to the open position.

10. The multi-function peripheral according to claim 4, further comprising:

a contacting portion disposed at the opening-closing member, the contacting portion being formed to, when the opening-closing member is in the closed position, protrude toward an upper end portion of the sheet supporter in the first position; and a contacted portion disposed at the upper end portion of the sheet supporter, the contacted portion being formed to, when the sheet supporter is in the first position, protrude toward the contacting portion of the opening-closing member in the closed position and extend in a direction perpendicular to the second axis, the contacted portion being configured such that the contacting portion slides in contact with the contacted portion when the opening-closing member moves to the open position.

11. The multi-function peripheral according to claim 5, further comprising:
- a contacting portion disposed at the opening-closing member, the contacting portion being formed to, when the opening-closing member is in the closed position, protrude toward an upper end portion of the sheet supporter in the first position; and
- a contacted portion disposed at the upper end portion of the sheet supporter, the contacted portion being formed to, when the sheet supporter is in the first position, protrude toward the contacting portion of the opening-closing member in the closed position and extend in a direction perpendicular to the second axis, the contacted portion being configured such that the contacting portion slides in contact with the contacted portion when the opening-closing member moves to the open position.

12. The multi-function peripheral according to claim 6, further comprising:
- a contacting portion disposed at the opening-closing member, the contacting portion being formed to, when the opening-closing member is in the closed position, protrude toward an upper end portion of the sheet supporter in the first position; and
- a contacted portion disposed at the upper end portion of the sheet supporter, the contacted portion being formed to, when the sheet supporter is in the first position, protrude toward the contacting portion of the opening-closing member in the closed position and extend in a direction perpendicular to the second axis, the contacted portion being configured such that the contacting portion slides in contact with the contacted portion when the opening-closing member moves to the open position.

\* \* \* \* \*